United States Patent [19]
Hedderly

[11] Patent Number: 5,606,892
[45] Date of Patent: Mar. 4, 1997

[54] MODULAR STEERING COLUMN ASSEMBLY

[75] Inventor: Gregory T. Hedderly, Livonia, Mich.

[73] Assignee: Ford Motor Company, Dearborn, Mich.

[21] Appl. No.: 414,453

[22] Filed: Mar. 31, 1995

[51] Int. Cl.⁶ .................. B62D 1/18; B62D 1/16
[52] U.S. Cl. .............. 74/493; 74/492; 74/502.4; 74/502.6; 280/775; 280/779; 439/34
[58] Field of Search ................ 74/492, 493, 502.4, 74/502.6; 280/775, 777, 779; 439/34

[56] References Cited

U.S. PATENT DOCUMENTS

| | | | |
|---|---|---|---|
| 4,432,565 | 2/1984 | Suzuki et al. | 280/779 |
| 4,452,096 | 6/1984 | Workman | 280/779 X |
| 4,703,669 | 11/1987 | Hyodo | 74/492 |
| 4,786,076 | 11/1988 | Wierschem | 280/777 |
| 4,946,195 | 8/1990 | Ioka et al. | 280/777 |
| 5,088,571 | 2/1992 | Burry et al. | 280/779 X |

*Primary Examiner*—Allan D. Herrmann
*Attorney, Agent, or Firm*—Gregory P. Brown; Roger L. May

[57] ABSTRACT

A steering column assembly includes a modular plug-in characteristic. A receiver is rigidly secured on a vehicle cross-car beam. A modular main housing assembly is slidably received by the receiver. Docking of electrical and mechanical connectors occurs as the modular main housing assembly is inserted into the receiver. A lower steering column shaft portion is supported within the receiver. The modular main housing assembly includes an upper steering column shaft portion for mating with the lower steering column shaft portion. The modular main housing assembly is installed in the receiver at any stage in a vehicle assembly after the instrument panel is installed.

15 Claims, 8 Drawing Sheets

MODULAR STEERING COLUMN ASSEMBLY

TECHNICAL FIELD

The present invention relates to a steering column assembly for a motor vehicle, and more particularly to a modular design for a steering column assembly.

BACKGROUND ART

Traditionally, installing a steering column assembly in a vehicle is a time consuming, expensive process due to design complexity and structural requirements. In prior art designs, the size and complexity of steering column assemblies creates numerous problems in vehicle assembly lines.

Steering column assembly configurations generally require a large opening in the instrument panel for installation of the steering column assembly. This large opening significantly reduces instrument panel structural integrity. Special handling or tie straps are required to prevent damage to the instrument panel because of this reduction in structural integrity.

Prior art designs require steering column assembly installation at a specific step in the vehicle assembly process. The steering column assembly is typically installed immediately after the instrument panel is installed in the vehicle. The cumbersome installation process generally requires trim line workers to attach a shift cable to the column along with at least five electrical plug connections, the PRNDL cable and its anchor screw, as well as adjusting the gear selector pointer, and attaching the intermediate shaft to the upper steering column shaft. This operation requires the installer to work in uncomfortable positions underneath the installed instrument panel. Additionally, once the steering column assembly has been installed, interior trim line workers must work around the steering column assembly and steering wheel which makes it more difficult to avoid infliction of cuts, scrapes, nicks or gouges in the steering wheel, horn cover, or shroud.

These prior art designs allow very little room for assembly flexibility. The steering column assembly is generally required to be inserted at a specific stage of the assembly process. Furthermore, the number of connections required and the awkward body positioning of the installer result in a time consuming and expensive assembly operation.

Another major problem experienced in prior art steering column assemblies is that these designs encroach into valuable impact absorption areas. Support arms which traditionally hold steering columns in position extend into impact areas. Vacating these impact areas adjacent the steering column assembly is essential for additional cushioning and energy absorption. Commonly, support arms, skid plates, TK yolks, and bird cage armor extend directly into impact areas and reduce the space available for energy absorption and cushioning equipment.

Until the present invention, there has been no known steering column assembly which avoids the above-referenced problems experienced by prior art steering column designs. No known design provides a flexible steering column assembly which may be installed in a vehicle as early as the instrument panel buildup line, or as late as the final assembly finish line, or anywhere in between. No known assembly has few connections to be made when installing the steering column assembly, or does not require the installer to assemble the column from awkward positions underneath the installed instrument panel. Furthermore, no known prior art steering column assembly provides the advantages of a tilting and telescoping steering column, while not requiring support hardware occupying areas adjacent the steering column assembly normally reserved for a knee bolster or other uses.

SUMMARY OF THE INVENTION

The present invention contemplates a modular steering column assembly which may be plugged into a receiver which is mounted in the vehicle.

The present invention also contemplates an internally stroking telescopic modular steering column assembly which may be plugged into a receiver in a one-step assembly operation at any point after the receiver and instrument panel have been installed in the vehicle.

This invention further contemplates a steering column assembly for use in a vehicle, comprising a receiver adapted to be supported within the vehicle. A lower steering column shaft portion is oriented and rotatably supported at least partially within the receiver. A modular main housing assembly is slidably insertable into the receiver, and includes an upper steering column shaft portion. The upper steering column shaft portion is telescopically mateable with the lower shaft portion when the modular main housing assembly is slidably inserted into the receiver.

The present invention also contemplates a steering column assembly for use in a vehicle, comprising a receiver adapted to be supported in the vehicle. A first electrical connector is supported with respect to the receiver, and a lower steering column shaft portion is rotatably supported at least partially within the receiver. A modular main housing assembly is insertable into the receiver, and includes an upper steering column shaft portion rotatably supported therein for telescoping engagement with the lower steering column assembly. The modular main housing also includes a second electrical connector adapted for mating with the first electrical connector as the modular main housing is slidably inserted into the receiver.

Another aspect of the present invention contemplates an improved steering column assembly for a vehicle having a modular, plug-in characteristic in first and second steering column portions. The first steering column portion comprises a receiver fixed with respect to the vehicle and adapted to support a first set of mechanical and electrical connectors. The second steering column portion comprises a housing configured with respect to the receiver to facilitate a telescoping plug-in relationship therebetween. The housing includes a second set of mechanical and electrical connectors which mate with the first set of mechanical and electrical connectors when the plug-in relationship is facilitated between the receiver and the housing.

The above objects and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
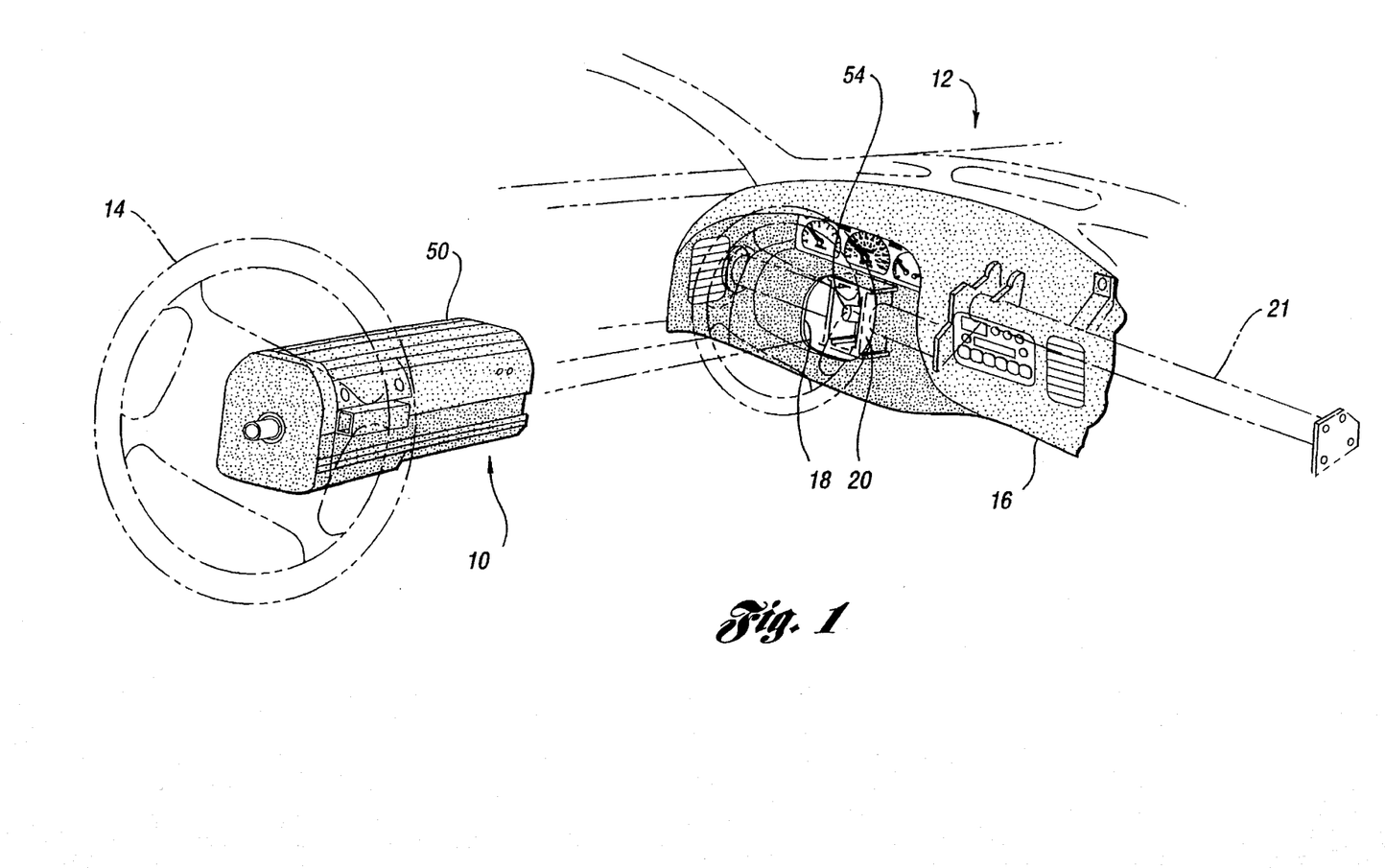
FIG. 1 is a schematically arranged perspective view of a modular steering column assembly to be inserted into a vehicle instrument panel in accordance with the present invention.

FIG. 1 shows a modular main housing assembly 10 to be installed in a vehicle 12 in accordance with the present invention. The modular main housing assembly 10 supports a steering wheel 14, shown in phantom in FIG. 1. In order to install the modular main housing assembly 10 into the instrument panel 16, the modular main housing assembly 10 is inserted through the small opening 18 in the instrument panel 16 and slid into the receiver 20. The receiver 20 is supported in the vehicle by a cross-car beam 21. Alternatively, the receiver 20 could be supported in a half-car beam, or it could be integrally supported within the vehicle structure.

The receiver 20 acts as a locator for the modular main housing assembly 10, and it guides the assembly as the steering column is being telescoped. The receiver 20 also guides the main housing assembly 10 in a high-energy impact situation. The receiver 20 includes four internal slippery sliding surfaces to smoothly coact with the modular main housing assembly to create a robust and smooth telescoping slide action. Alternatively, a roller-bearing arrangement could be disposed between the receiver 20 and the main housing assembly 10 to provide the desired low-friction slide action, or an engineered plastic coating could provide the desired effect. The receiver 20 reacts to peak loads in daily use, and also supports all loads applied to the steering wheel 14 in a high-energy impact.

The receiver 20 is configured to be compatible with varying support structure systems and can be constructed to neutralize side to side construction variation. Since the receiver also acts as a column support structure, its attachment to the body structure is lower than that of prior art designs. Accordingly, the area forward of the instrument cluster is vacated. This facilitates easier wire routing, module packaging, and air movement to the driver side of the instrument panel without interference from the column support structure. In addition, this will provide styling options that could not be entertained previously.

Another advantage of the receiver design is that it provides means for optimally cushioning ride-down and energy dissipation in a high impact situation by (i) extending the effective length of the ride-down or steering column collapse and (ii) allowing for additional occupant cushioning materials. The support arms which traditionally support steering columns and extend below the steering column have been replaced with the receiver, which is mounted directly to the cross-car beam. Furthermore, the stiffness of the overall support structure is substantially enhanced. Additionally, lateral stiffness of the design improves vibration frequency characteristics.

Figure 2A:
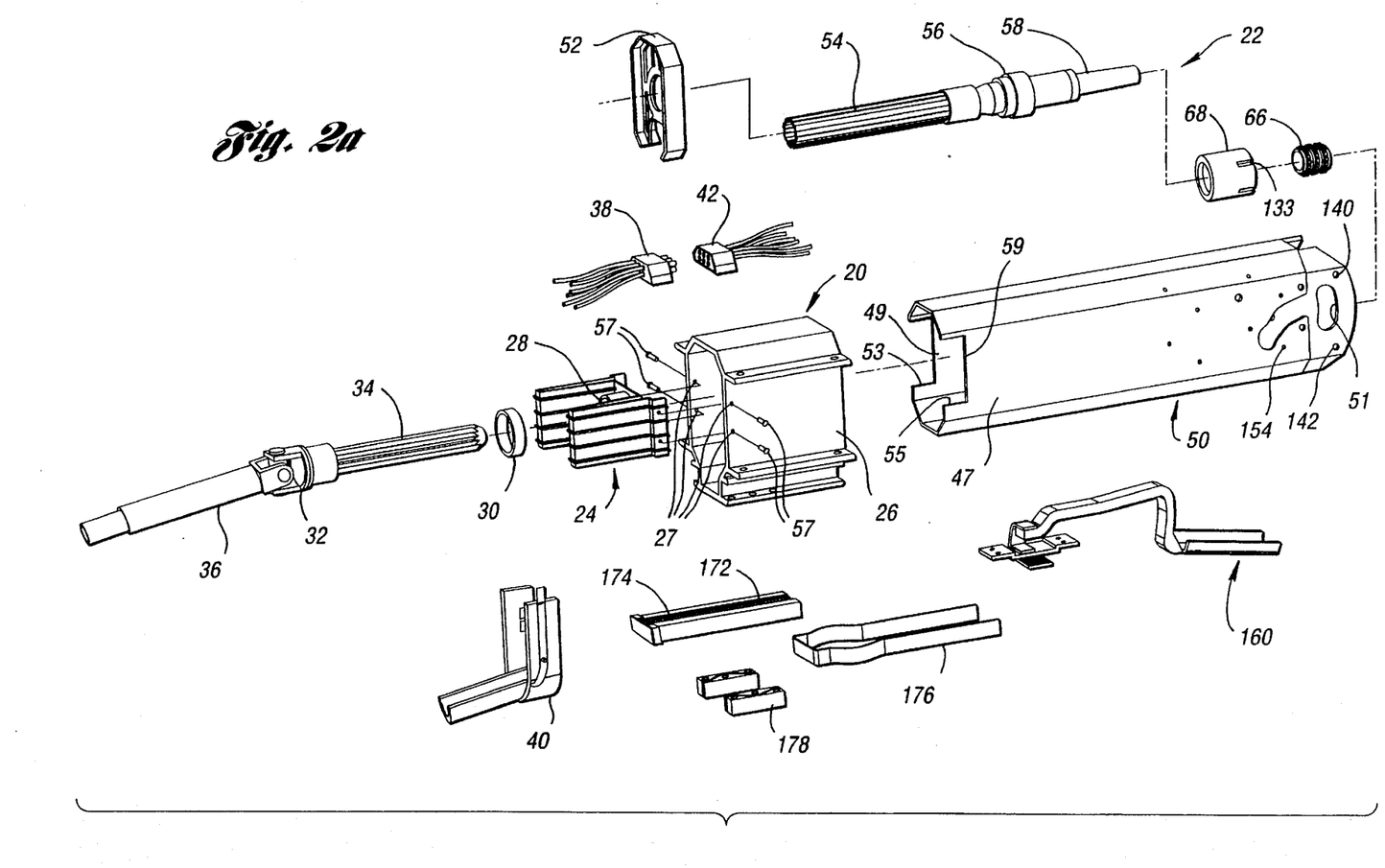
FIG. 2a shows an exploded perspective view of components of a modular steering column assembly in accordance with the present invention.
Figure 2B:
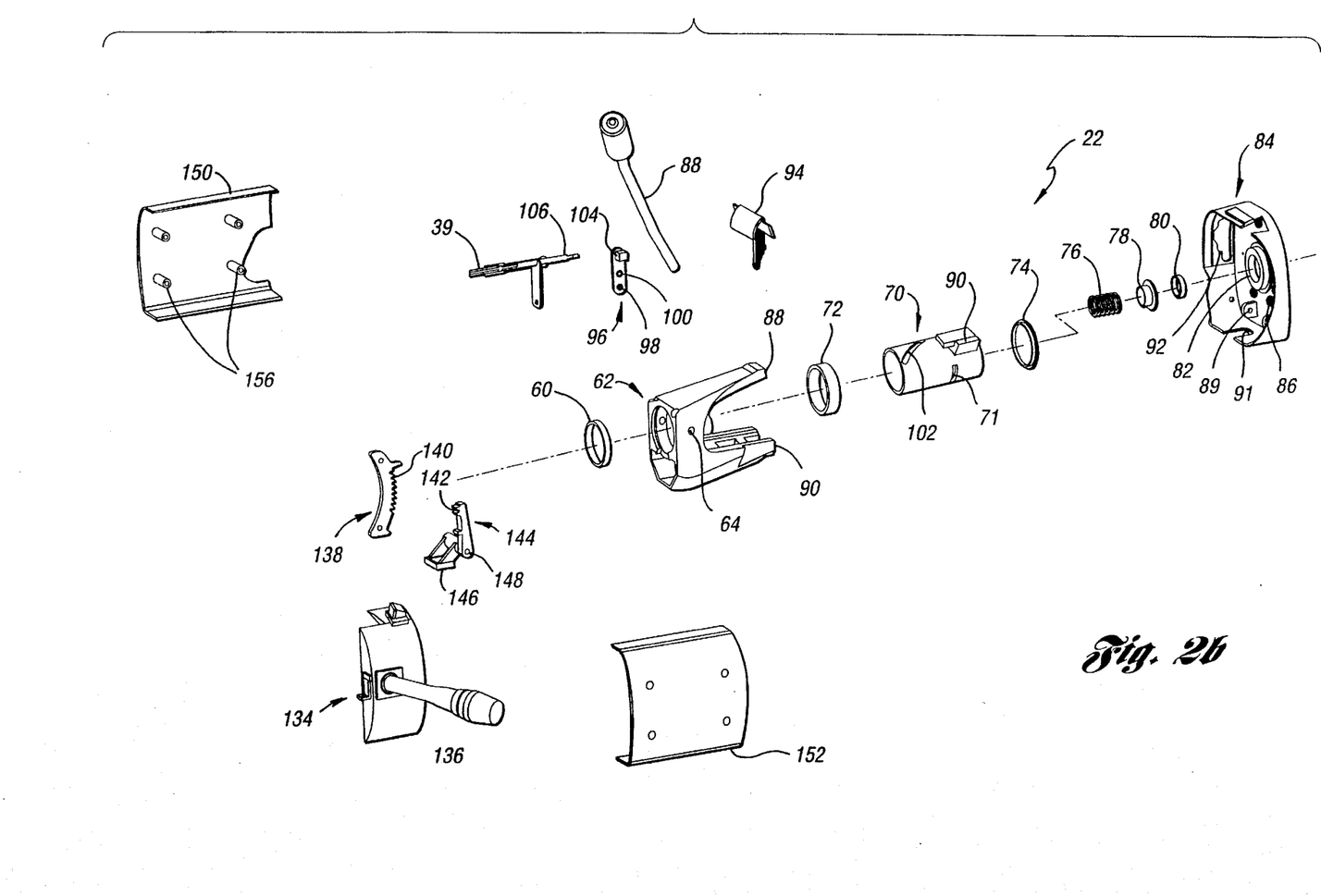
FIG. 2b shows an exploded perspective view of components of a modular steering column assembly in accordance with the present invention.

FIGS. 2a and 2b show exploded perspective views of portions of the steering column assembly 22. The modular steering column assembly 22 includes the receiver 20 which is mounted on a cross car beam 21 in a vehicle 12 (as shown in FIG. 1). A lower bearing retainer 24 is secured to the sidewalls 26 of the receiver 20 at the mounting holes 27. The lower bearing retainer 24 has a central aperture 28 formed therethrough for receiving the lower bearing 30. The lower bearing 30 rotatably supports the lower universal joint 32. A lower steering column shaft 34 and an intermediate shaft 36 are connected to the lower universal joint 32.

Prior to installation of the modular main housing assembly 10, the receiver 20, lower bearing retainer 24, lower bearing 30, lower electrical connector 38, lower transmission cable 39, and lower steering column shaft 34 are in position to receive the modular main housing assembly 10. The lower steering column shaft 34, lower transmission cable 39, and the lower electrical connector 38 are supported by the reusable installation tool 40.

The modular main housing assembly 10 includes a telescope housing 50 for mating with the receiver 20. The upper steering column support 52 supports the upper steering column shaft 54, which is positioned within the telescope housing 50, for telescopic mating with the lower steering column shaft 34. The upper steering column shaft 54 is supported within the central aperture 53 formed in the steering column support 52. The upper steering column shaft 54 is connected to an upper universal joint 56, which includes a tilt shaft 58 connected thereto at the opposite end. The upper universal joint 56 is supported by the upper bearing 60 in the tilt head 62. The tilt head 62 is pivotally connected to the telescope housing 50 at the pivot joint 64.

A retainer ring 66 rigidly secures the lock collar 68 to the tilt shaft 58 above the upper universal joint 56. The shift socket 70 is disposed concentrically about the tilt shaft 58, and is rotatably supported by the bearings 72,74. This arrangement is more clearly shown in FIG. 3b. The spring 76 biases the support cap 78 against the bearing 80. The bearing 80 rotatably supports the upper portion of the tilt shaft 58 within the aperture 82 formed in the tilt plate 84. The tilt plate 84 is secured to the tilt head 62 by screws extending through the apertures 86 in the tilt plate 84 and into the upper ends 88,90 of the tilt head 62.

The gear shift lever 88 is secured to the shift socket 70 by the jaws 90. The gear shift lever 88 is secured in desired PRNDL positions by the detent arrangement 92 in the tilt plate 84. The position of the lever 88 is displayed on the PRNDL member 94.

Figure 3A:
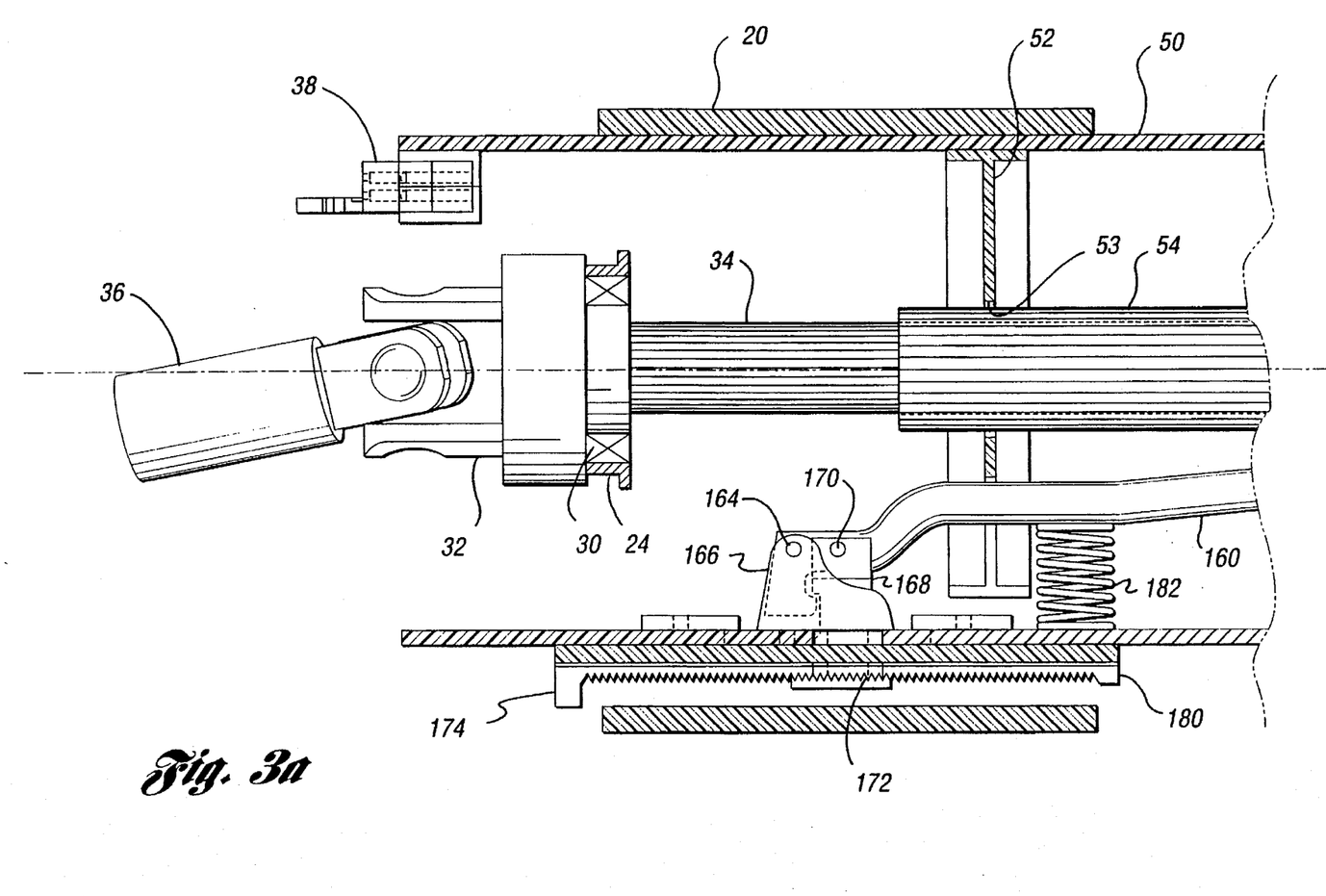
FIG. 3a shows a cutaway side view of the lower portion of a modular steering column assembly in accordance with the present invention.
Figure 3B:
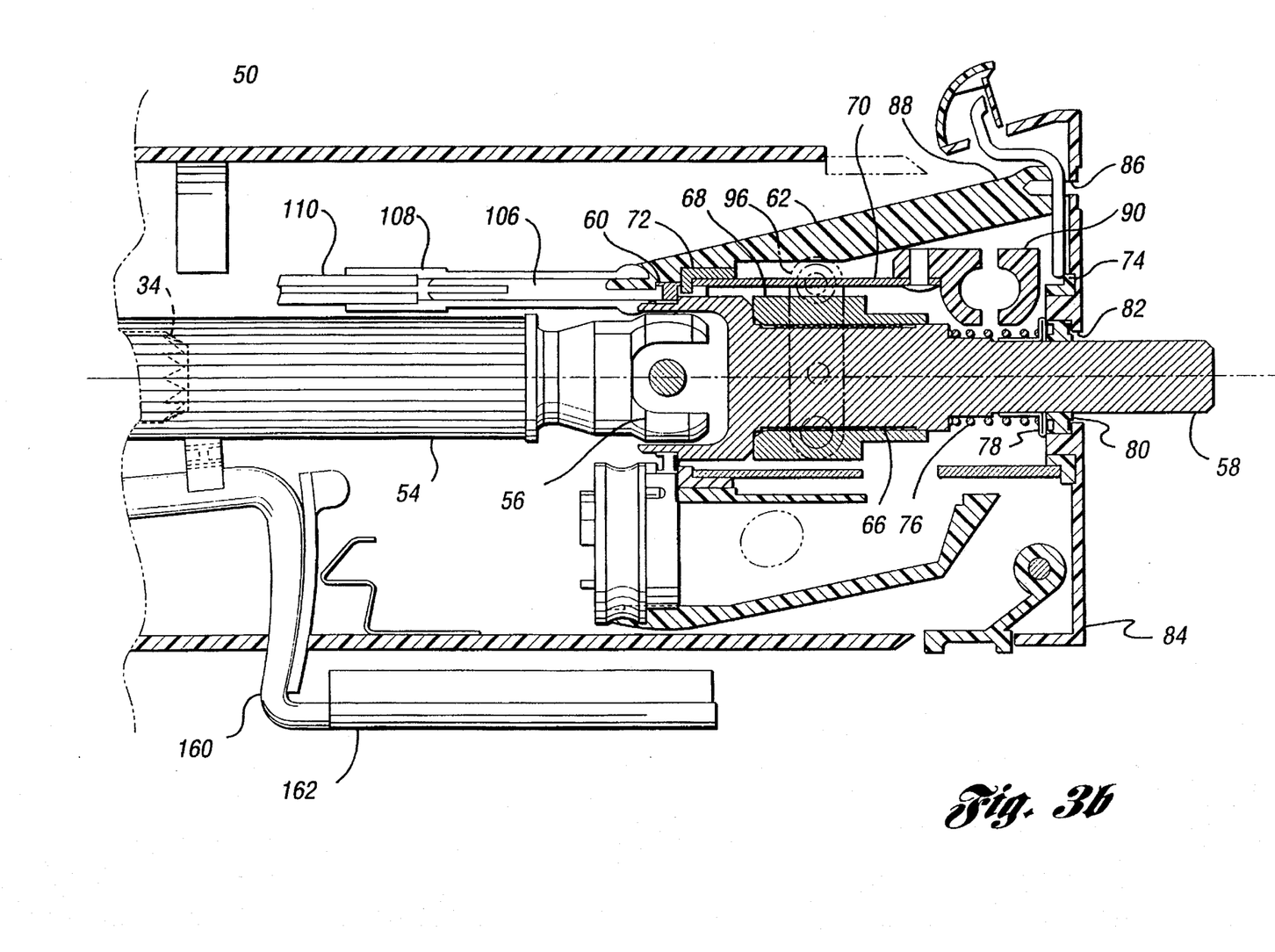
FIG. 3b shows a cutaway side view of the upper portion of a modular steering column assembly in accordance with the present invention.
Figure 4:
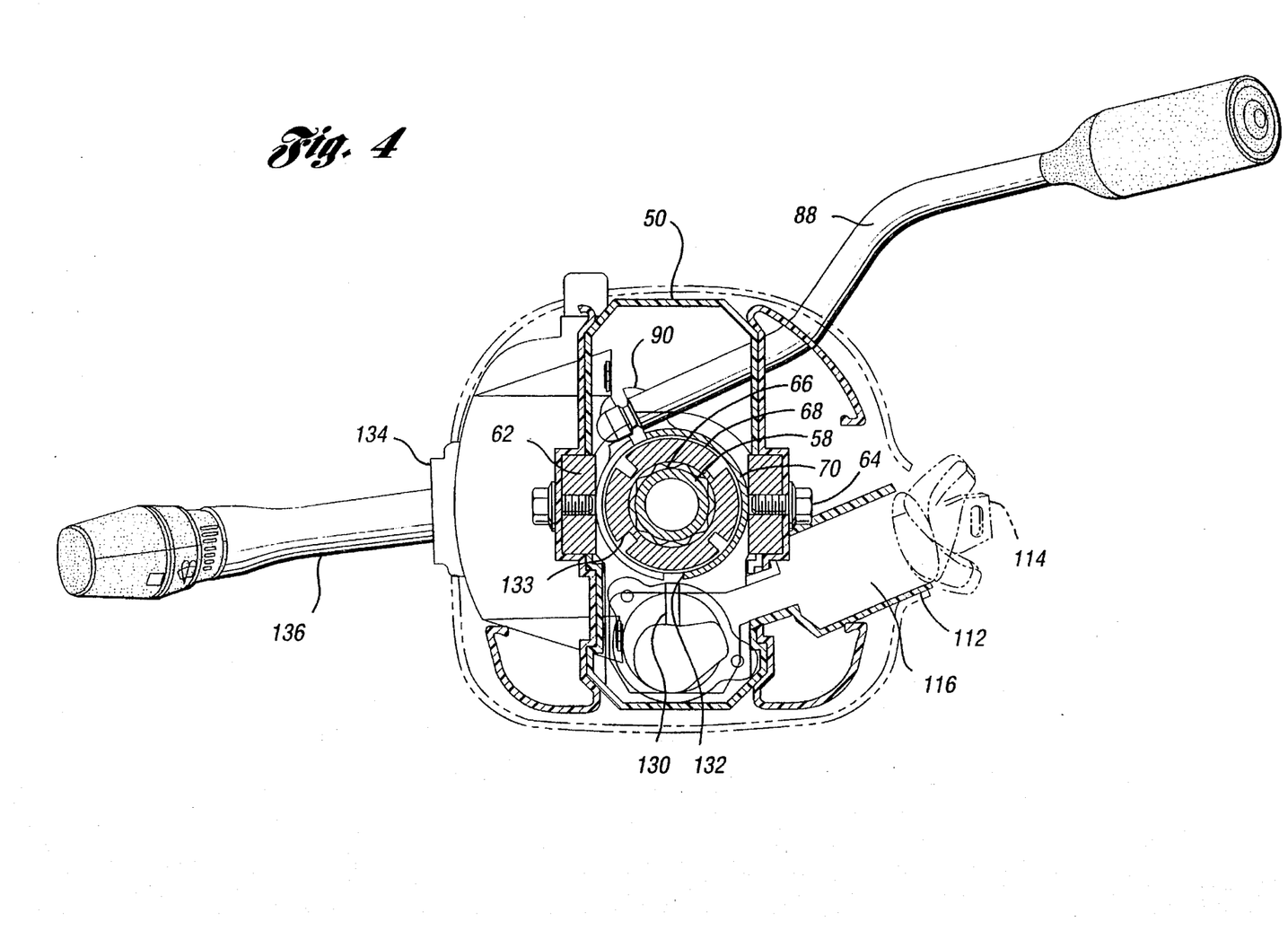
FIG. 4 shows a schematically arranged cutaway sectional front view of a steering column assembly tilt head in accordance with the present invention.
Figure 5:
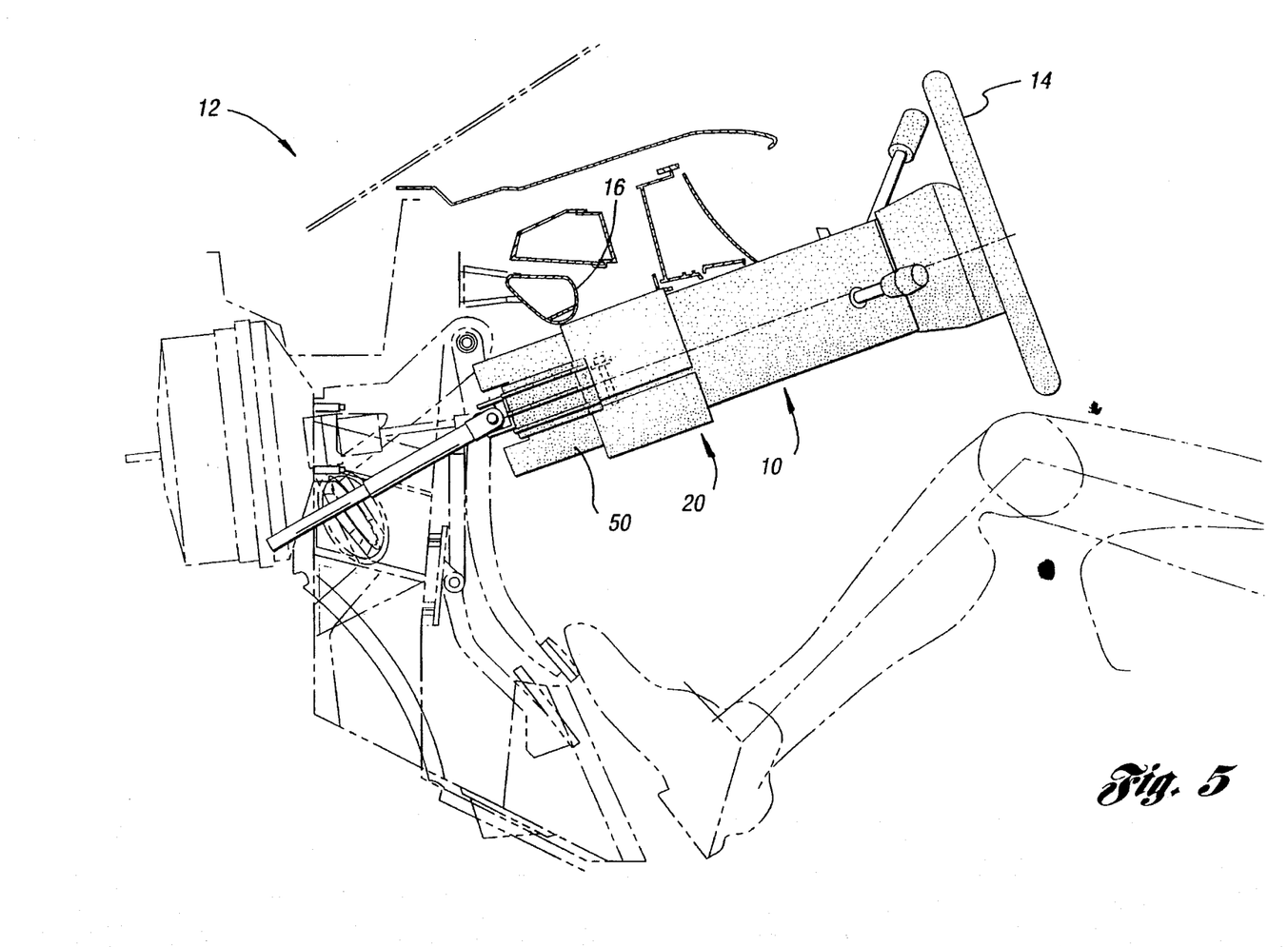
FIG. 5 shows a side view of a modular steering column assembly installed in a vehicle in accordance with the present invention.

Referring to FIGS. 2b, 3b and 4, movement of the gear shift lever 88 causes rotation of the shift socket 70 about the tilt shaft 58. A selector arm 96 is pivotally mounted to the tilt head 62 at the pivot joint 98. The selector arm 96 includes a guide pin 100, which engages the helical slot 102 formed in the shift socket 70 (see FIG. 2b). The distal end 104 of the selector arm 96 is connected to the upper transmission cable 106. The upper transmission cable 106 includes a mating plug 108 for mating with the lower transmission cable 39, which leads to the transmission. The lower transmission cable 39 is guided into and mated with the transmission mating plug 108 when the modular main housing assembly 10 is inserted into the receiver 20.

Rotation of the shift socket 70 by the gear shift lever 88 causes the guide pin 100 to travel along the helical slot 102 formed in the shift socket 70. The selector arm 96 then pivots about the pivot joint 98 as the guide pin 100 travels in the helical slot 102. Accordingly, the distal end 104 of the selector arm 96 is moved axially along the tilt shaft 58. The distal end 104 of the selector arm 96 is connected to the transmission cable 106, so that rotation of the shift socket 70 translates into linear movement of the transmission cable 106 along the tilt shaft 58 and along the upper steering column shaft 54. In this manner, transmission gears are selected by movement of the shift lever 88, which translates into linear movement of the transmission cable 106.

Referring to the schematically arranged FIG. 4, the ignition housing 112 is integral with the tilt head 62. Rotation of the key 114 actuates the ignition mechanism (not shown), which actuates the lock paw 130 to engage the locking slot 132 formed in the shift socket 70 when the shift lever 88 is in the park position. An upward spring bias on the lock paw 130 causes the lock paw 130 to engage one of the slots 133 formed in the lock collar 68 when the tilt shaft 58 is rotated to cause alignment between the shift socket locking slot 132 and one of the lock collar slots 133. In this manner, the lock paw 130 is engaged with both the shift socket 70 and the lock collar 68, thereby preventing movement of the shift lever 88, or rotation of the tilt shaft 58. Accordingly, the steering wheel 14 and shift lever 88 are prevented from rotation for theft prevention purposes.

Referring to FIGS. 2b and 4, a multi-function switch assembly 134 and blinker lever 136 are connected to the telescope housing 50. The multi-function switch assembly 134 includes a switch (not shown) which extends through the side opening 51 in the telescope housing 50 (shown in FIG. 2a). The switch further extends through the slot 71 in the shift socket 70 for engagement with the slots 133 formed in the lock collar 68. When the steering column is rotated in a direction opposite that of the blinker indicator, the switch engages with one of the slots 134 in order to cancel the blinker.

The tilt head 62 is pivotally mounted with respect to the telescope housing 50 for user adjustment of steering wheel height. The tilt head 62 may be secured in a desired angular position with respect to the telescope housing 50 by a bracket and paw assembly, shown in FIG. 2b. The tilt bracket 138 is secured to the telescope housing 50 at the apertures 140,142 formed in the telescope housing 50 (shown in FIG. 2a). The tilt bracket 138 includes a plurality of teeth 140 formed thereon for engagement with teeth 142 extending from the tilt lever 144. The tilt lever 144 is pivotally connected to the tilt plate 84 at the lever mounting holes 89 on the rear of the tilt plate 84. A thumb button 146 extends from the tilt lever 144 into a slot 91 formed in the bottom of the tilt plate 84. The driver may depress the thumb button 146 to pivot the tilt lever 144 about the joint 148 to disengage the tilt lever teeth 142 from the tilt bracket teeth 140. In this manner, the driver may adjust the tilt head 62 to a desired steering wheel position, and release the thumb button 146 to reengage the tilt bracket 138 and tilt lever 144.

As shown in FIG. 2b, a pair of support shrouds 150,152 are connected to the telescope housing 50 at the shroud holes 154. Hollow bosses 156 extend from the rear of the support shrouds 150,152 into communication with the shroud holes 154. A plurality of screws secure the support shrouds 150, 152 to the telescope housing 50 through the hollow bosses 156 and shroud holes 154.

Referring to FIGS. 3a and 3b, telescoping movement of the telescope housing 50 with respect to the receiver 20 is controlled by the lever 160. The lever 160 includes a handle 162 which extends below the telescope housing 50 for driver manipulation. The handle 160 is pivotally mounted to the telescope housing 50 at the pivot joint 164 through the bracket 166. The lever 160 is also pivotally mounted to a lock member 168 at pivot joint 170. The lock member 168 includes a plurality of teeth 172, which are engageable with the teeth of a rack 174. The rack 174 is connected to the receiver 20 by means of the energy absorption ribbon 176 and pegs 178. The telescoping travel of the telescope housing 50 is limited by the length of the rack 174. When the lock 168 reaches the end of the rack, no further movement can occur in that direction.

The configuration of the pivot joints 164,170 will cause the teeth of the lock member 168 and the teeth of the rack 174 to wedge more firmly together when force is exerted axially on the column. In a crash situation, the jaws will remain locked, and the telescope housing and rack will force the ribbons 176 through the pegs 178 to dissipate the driver's energy.

To install the modular main housing assembly 10 into the receiver 20, the lever 160 must be depressed sufficiently to extend the lock member teeth 172 below the forward portion 180 of the rack 174 for clearance. When the lever 160 has been sufficiently depressed so that the lock member teeth 172 clear the forward portion 180 of the rack 174, the modular main housing assembly 10 may be inserted into the receiver 20. The spring 182 biases the lever 160 upwardly in order to bias the lock member 168 upward to cause engagement between the lock member teeth 172 and the rack 174. In a high-energy impact, the lock member teeth 172 and rack 174 will remain engaged while the pegs 178 deform the energy dissipation ribbon 176 to dissipate impact energy during ride-down.

For installation, the installer simply inserts the modular main housing assembly 10 into the receiver 20 and grasps the steering wheel 14 to push the modular main housing assembly 10 into the receiver 20 for docking. The lever 160 must be sufficiently lowered for the lock member to clear the forward portion of the rack 174 for installation. Once engagement between the main housing and receiver has occurred, the receiver precisely locates and guides the main housing, which allows for blind docking of the lower and upper steering column shafts 34,54, the lower and upper electrical connectors, 38,42, and the transmission mating plug 108 and lower transmission cable 39. Mating of the respective portions occurs at different times in order to minimize the axial force required for installation.

Figure 6:
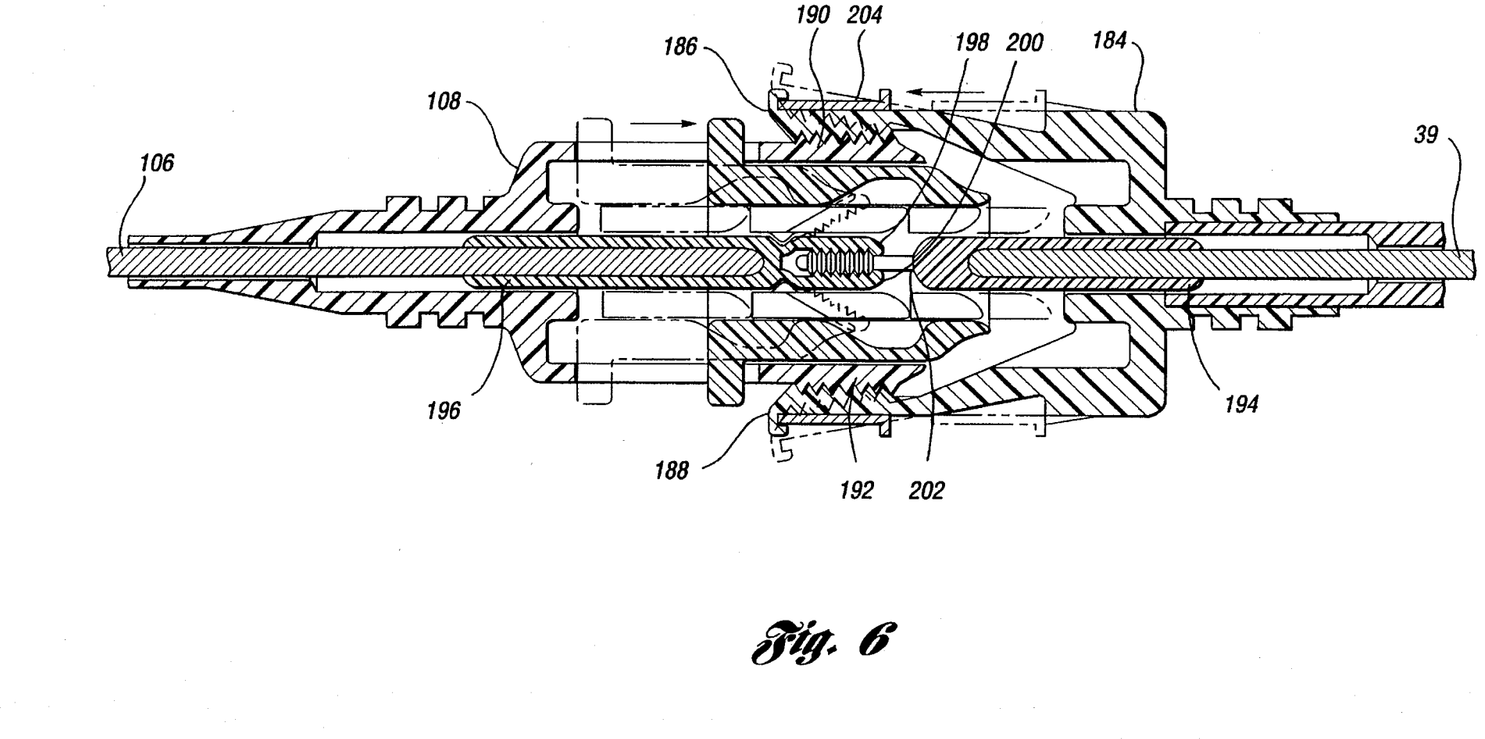
FIG. 6 shows a vertical cross-section of the upper and lower transmission cable attachment.

The docking of the upper and lower transmission cables 106,39 is illustrated in FIG. 6. The lower plug 184 is supported by the installation tool 40 (FIG. 2a). The lower plug 184 includes a pair of expandable jaws 186,188, which are mateable with the jaws 190,192 of the upper mating plug 108. The upper and lower transmission cables 106,39 include lower and upper plastic sleeves 194,196 secured to the respective cable. The upper sleeve 196 extends to include a pair of expandable jaws 198,200. The jaws 198, 200 are expandable to receive and cooperate with the externally threaded probe 202, which is secured to the lower sleeve 194. Accordingly, for docking, the lower plug 184 receives the upper mating plug 108. The jaws 186,188 spread to allow insertion of the upper plug. The jaws 186,188 then retract for engagement with the jaws 190,192 of the upper plug. The retainer ring 204 is slid into place over the jaws 186,188 in order to secure the upper and lower plugs 184,108 together. At this point, the upper and lower transmission cables are attached and ready for transmission shifting movement. Of course, the upper and lower mating plugs and the respective jaw configurations could be reversed to achieve the same effect.

Once in the telescoping position, the driver will be prevented from removing the modular main housing assembly 10 from the receiver 20 by either limiting handle movement with a lock mechanism (not shown) so that lock member teeth 172 do not clear the rearward portion 180, or by preventing the lower portion of the lock member 168 from exiting the rack 174 with a rack-entry locking member (not shown).

The modular main housing assembly 10 is installed into the receiver without the use of tools, except for the installation tool 40, which is slidingly received within the receiver 20 and supports the shaft 34 in an aligned position with the shaft 54. Also, the assembly 10 may be retracted as a module for servicing.

While the best modes for carrying out the invention have been described in detail, those familiar with the art to which this invention relates will recognize various alternative designs and embodiments for practicing the invention. Thus the above described preferred embodiment is intended to be illustrative of the invention which may be modified within the scope of the following appended claims.

What is claimed is:

1. A steering column assembly for use in a vehicle, comprising:
    a receiver adapted to be supported within the vehicle;
    a lower steering column shaft portion oriented and rotatably supported at least partially within said receiver; and
    a modular main housing assembly slidably insertable into said receiver, and having an upper steering column shaft portion therewithin, said upper steering column shaft portion being telescopically mateable with said lower shaft portion when said modular main housing assembly is slidably inserted into said receiver.

2. The steering column assembly of claim 1 further comprising:
    a lower bearing retainer secured to said receiver; and
    a lower universal joint rotatably supported within said lower bearing retainer and coupled with said lower steering column shaft portion.

3. The steering column assembly of claim 1, wherein said modular main housing assembly comprises:
    a telescope housing;
    an upper universal joint coupled to said upper steering column shaft portion; and
    a tilt head pivotally connected to said telescope housing and rotatably supporting said upper universal joint.

4. A steering column assembly of claim 3, wherein said modular main housing assembly further comprises:
    a tilt rack secured to said telescope housing; and
    a toothed member pivotally secured with respect to said tilt head for selective engagement with said tilt rack, whereby to selectively pivotally secure said tilt head with respect to said modular main housing assembly.

5. The steering column assembly of claim 4, further comprising:
    a first electrical connector carried by said modular main housing assembly; and
    a second electrical connector supported with respect to said receiver for selective engagement with said first electrical connector as said modular main housing assembly is slidably inserted into said receiver.

6. The steering column assembly of claim 1, further comprising:
    a cross-car beam integrally supporting said receiver with respect to the vehicle.

7. The steering column assembly of claim 3, wherein said telescope housing comprises a support member secured therein and having a central aperture formed therethrough for receiving and supporting said upper steering column shaft to facilitate mating with said lower steering column shaft.

8. An improved steering column assembly for a vehicle having a modular, plug-in characteristic in first and second steering column portions, and comprising:
    a receiver as said first steering column portion fixed with respect to the vehicle and adapted to support in oriented relationship thereto a first set of mechanical and electrical connectors, and
    a modular main housing as said second steering column portion configured with respect to said receiver to facilitate a telescoping plug-in relationship therebetween,
    said modular main housing including a second set of mechanical and electrical connectors which mate with said first set of mechanical and electrical connectors, respectively, when said plug-in relationship is facilitated between said receiver and said modular main housing.

9. The improved steering column assembly of claim 8, wherein said first and second mechanical connectors comprise, respectively, a lower steering column shaft portion rotatably supported within said receiver and an upper steering column shaft portion rotatably supported within said modular main housing and adapted for telescopic mating with said lower steering column shaft portion when said modular main housing is slidably inserted into said receiver.

10. The improved steering column assembly of claim 9 further comprising:
    a lower bearing retainer secured to said receiver; and
    a lower universal joint rotatably supported within said lower bearing retainer and coupled with said lower steering column shaft portion.

11. The improved steering column assembly of claim 9, wherein said modular main housing comprises:
    a telescope housing;
    an upper universal joint coupled to said upper steering column shaft portion; and
    a tilt head pivotally connected to said telescope housing and rotatably supporting said upper universal joint.

12. The improved steering column assembly of claim 11, wherein said modular main housing further comprises:
    a tilt rack secured to said telescope housing; and
    a toothed member pivotally secured with respect to said tilt head for selective engagement with said tilt rack, whereby to selectively pivotally secure said tilt head with respect to said modular main housing.

13. The improved steering column assembly of claim 8, further comprising:
    a cross-car beam integrally supporting said receiver with respect to the vehicle.

14. The steering column assembly of claim 11, wherein said telescope housing comprises a support member secured therein and having a central aperture formed therethrough for receiving and supporting said upper steering column shaft to facilitate mating with said lower steering column shaft.

15. A steering column assembly for use in a vehicle, comprising:

a receiver adapted to be supported within the vehicle;

a lower steering column shaft portion oriented and rotatably supported at least partially within said receiver;

a modular main housing assembly slidably insertable into said receiver, and having an upper steering column shaft portion therewithin, said upper steering column shaft portion being telescopically mateable with said lower shaft portion when said modular main housing assembly is slidably inserted into said receiver;

a first rack secured to said receiver;

a second rack pivotally secured with respect to said modular main housing assembly for selective releasable engagement with said first rack whereby to selectively axially secure said modular main housing assembly with respect to said receiver;

a lower bearing retainer secured to said receiver;

a lower universal joint rotatably supported within said lower bearing retainer and coupled with said lower steering column shaft portion;

a first electrical connector carried by said modular main housing assembly;

a second electrical connector supported with respect to said receiver for selective engagement with said first electrical connector as said modular main housing assembly is slidably inserted into said receiver; and a cross-car beam integrally supporting said receiver with respect to the vehicle.

\* \* \* \* \*